3,024,297
DEPOLARIZER FOR RECHARGEABLE CELLS
Lewis F. Urry, Parma, Ohio, assignor to Union Carbide Corporation, a corporation of New York
No Drawing. Filed Nov. 12, 1959, Ser. No. 852,201
5 Claims. (Cl. 136—139)

This invention relates to rechargeable alkaline galvanic cells and it more particularly relates to an improved cathode-depolarizer for such cells.

In order to produce electric power by galvanic action, a cell system comprising an anode, a cathode-depolarizer, and an electrolyte must be chemically reacted. In this process, the materials used for these elements become exhausted to an extent that upon discharge of the cell, the anode has become oxidized and the cathode-depolarizer has become reduced to totally different chemical substances from those which initially made up the cell. In certain galvanic systems, it is possible to reactivate the cell elements by passing current through the cell. This current effectively reverses the electricity producing process, thus recombining the elements of the cell into a charged state such that the cell may again be discharged to produce electric power by galvanic action. It is obvious that cells of this type are very advantageous for certain applications. Some of the more common uses to which rechargeable cells are put are automobile starting systems and submarine power plants.

Certain cathode-depolarizers which are well known to the primary galvanic cell art have come to the attention of people working with alkaline secondary (rechargeable) cells because of their availability and relatively moderate price. It has been suggested that either mercuric oxide or manganese dioxide would have advantages to offer the recharageable cell field. Mercuric oxide may be discharged at high current drains while yielding a high output per unit volume. Another important characteristic of this material is that its voltage against time discharge curve is relatively flat. Unfortunately, these good properties of mercuric oxide are offset by the fact that upon discharge, metallic mercury is formed and this material coalesces. When it is sought to recharge the mercury by electrolytic oxidation, only the outside surface of the mercury can be oxidized because the oxide formed effectively shields the remainder of the mercury from further oxidation. In addition to this, mercury charges at a relatively constant potential, until the charging is complete, at which time the cell voltage rises substantially instantaneously to the decomposition potential of the electrolyte of the cell being charged. This steep rise makes it practically impossible to put a voltage cutoff sensing device in the system which is capable of stopping the charging operation before the electrolyte decomposition potential is reached.

Manganese dioxide has been considered as a cathode-depolarizer for rechargeable alkaline galvanic cells because of its low cost, good depolarizing action, and ready availability. This material, however, shown a tendency to discharge at decreasing voltage over a period of time. Also, while a spent manganese dioxide electrode is rechargeable by the passage of current therethrough, this rechargeability is lost when it is discharged beyond a certain critical oxidation level. Thus, this material cannot be effectively recharged after a deep discharge.

It is therefore the principal object of this invention to provide a cathode-depolarizer for rechargeable alkaline galvanic cells which operates at high currents with a high output per unit volume.

It is another object of this invention to provide such a cathode-depolarizer which exhibits a relatively flat discharge curve under load.

It is a further object of this invention to provide such a cathode-depolarizer which exhibits a charging curve such that a voltage cutoff device may be used to maintain the charging voltage below a level which is destructive to other cell elements.

These objects are fulfilled by this invention which comprises a cathode-depolarizer mix for rechargeable alkaline galvanic cells which comprises 13 percent to 95 percent by weight of manganese dioxide and 5 percent to 87 percent by weight mercuric oxide.

It is necessary in the practice of this invention that the proportion of mercuric oxide in the mixture be less than that quantity which when reduced to mercury will coalesce to form an agglomarate mass. This maximum has been determined to be 87 percent by weight or 75 percent by volume of the oxide. The remainder of the mix may be either manganese dioxide alone or manganese dioxide mixed with carbon. The range of proportions which have been found useful for the practice of this invention are 5 percent to 87 percent by weight, or 3 percent to 75 percent by volume, mercuric oxide; and 13 percent to 95 percent by weight, or 25 percent to 97 percent by volume, manganese dioxide. The preferred range of proportions is 52 percent to 87 percent by weight, or 33 percent to 75 percent by volume, mercuric oxide; and 13 percent to 48 percent by weight, or 25 percent to 67 percent by volume, manganese dioxide. While it has been stated that a conductive material, such as carbon, may be added to the cathode-depolarizer mix as described, it is to be understood that one of the features of this invention is that the mixture described is sufficiently conductive of its own accord to sustain the galvanic action of the cell without the inclusion of an additional conductive material.

It has been found expedient to prepare the mixed depolarizer by coating a particle of mercuric oxide with a thin shell of manganese dioxide. This procedure may be carried out by adding finely-powdered mercuric oxide to a clear aqueous solution of manganese nitrate. The mercuric oxide, being insoluble in the manganese nitrate solution, forms a slurry wherein each particle of the oxide is coated with a thin film of solution. After thorough mixing, the slurry is dried until a damp mass is obtained whereupon the mass is broken up into pellets. These pellets are baked causing the thin film of manganese nitrate to decompose into manganese dioxide and adhere to the mercuric oxide particles. Upon decomposition, the manganese nitrate also forms volatile nitric oxide which passes out of the system and may be collected. If desired, the pellets of manganese dioxide-coated mercuric oxide particles may be crushed to a powder, suitably smaller than 0.0029 inch and used directly as a cathode-depolarizer in a rechargeable alkaline galvanic cell.

The thin layer of manganese dioxide formed by the above-described method serves to keep each individual mercuric oxide particle from physical contact with other like particles. This manganese dioxide layer, when in the reduced oxide form particularly, is hard, solid, electrolyte insoluble, porous, and semi-conductive. Because of these properties, electrolytic and electric contact with the mercuric oxide is permitted. Also, and probably more important, is the fact that the reduced manganese dioxide layer prevents the mercury, formed by the discharge of the mercuric oxide, from physically contacting other similar pools of mercury and coalescing to a non-rechargeable mass. Therefore, both oxides contribute as cathode-depolarizer material, and both materials are rendered rechargeable because of their physical relationship brought about by this process. In addition to these physical advantages, the voltage charging curve for the combined oxides is flat until all the mercury is charged to mercuric oxide and then rises rapidly but not instantaneously while the reduced oxides of manganese are being charged.

Such behavior makes it possible to electrically insure the non-destructive charging of a cell containing these materials by the inclusion of a voltage cutoff device to stop the charging current when a certain predetermined voltage is reached. This mixture permits construction of cells which are capable of withstanding heavy discharge drain at fairly constant voltage. Because of this, cells employing this mixed cathode-depolarizer yield almost all the output theoretically potentially in the cell.

The following may be cited as specific examples of the practice of this invention:

*Example I*

A cathode-depolarizer mix containing 69 percent by weight mercuric oxide and 31 percent by weight manganese dioxide was prepared by adding 150 grams of powdered mercuric oxide, through 250 mesh (Tyler Standard), to 247.02 grams of a 50 percent by weight aqueous solution of manganese nitrate. The slurry thus formed was thoroughly mixed and then dried under constant agitation. The damp mass thus obtained was then broken into pellets about 0.0098 inch in diameter, and the pellets heated in an oven at 500° F. for 30 minutes. After this the pellets were ground into particles small enough to pass through a 200 mesh (Tyler Standard) screen and stored for future use in rechargeable alkaline cells.

*Example II*

A cathode-depolarizer mix containing 83.2 percent by weight mercuric oxide and 16.8 percent by weight manganese dioxide was prepared by adding 330 grams of 250 mesh (Tyler Standard) mercuric oxide to 274 grams of a 50 percent by weight aqueous solution of manganese nitrate. The slurry thus formed was thoroughly mixed and then dried under constant agitation. The damp mass thus obtained was then broken into pellets small enough to pass through a 60 mesh (Tyler Standard) screen, and the pellets heated in an oven at 500° F. for 30 minutes. After this the pellets were ground into particles small enough to pass through a 200 mesh (Tyler Standard) screen and stored for future use in rechargeable alkaline cells.

*Example III*

A cathode-depolarizer mix containing 25 percent by weight mercuric oxide and 75 percent by weight manganese dioxide was prepared by adding 14 grams of 250 mesh (Tyler Standard) mercuric oxide to 172 grams of a 50 percent by weight aqueous solution of manganese nitrate. The slurry thus formed was thoroughly mixed and then dried under constant agitation. The damp mass thus obtained was then broken into pellets less than 0.01 inch in diameter, and the pellets heated in an oven at 500° F. for 30 minutes. After this the pellets were ground into particles less than 0.003 inch in diameter and stored for future use in rechargeable alkaline cells.

Cathode-depolarizer mix made according to this invention has been incorporated in standard rechargeable alkaline cells and tested to determine the characteristics of its charge-discharge cycles. It was found that the discharge (potential against time) of such cathode-depolarized electrodes was the same after 40 cycles as it was upon initial discharge. Negative electrodes used in the cells thus tested were made of zinc and cadmium but it has been found that many other anodes are adapted to use in conjunction with the cathode-depolarizer electrode described herein.

What is claimed is:

1. The method of forming a cathode-depolarizer mix for rechargeable alkaline galvanic cells which comprises adding finely divided mercuric oxide powder to a clear aqueous solution of manganese nitrate; mixing the slurry thus formed; drying said slurry to a damp mass; separating said mass into pellets; and baking said pellets in an oven.

2. The method of forming a cathode-depolarizer mix for rechargeable alkaline galvanic cells which comprises adding 250 mesh (Tyler Standard) mercuric oxide powder to a clear aqueous solution of manganese nitrate; mixing the slurry thus formed; drying said slurry to a damp mass while mixing said slurry; separating said mass into pellets; and baking said pellets in an oven at about 500° F. for about thirty minutes.

3. A rechargeable cathode-depolarizer mix for use in alkaline galvanic cells comprising particles of mercuric oxide each of which is substantially covered by a hard shell of manganese dioxide.

4. A cathode-depolarizer mix for rechargeable alkaline galvanic cells which comprises a mass of individual particles of mercuric oxide wherein each individual particle is substantially completely coated with manganese dioxide, said mercuric oxide consstituting 5 percent to 87 percent by weight of said mix.

5. A cathode-depolarizer mix for rechargeable alkaline galvanic cells which comprises a mass of individual particles of mercuric oxide wherein each individual particle is substantially completely coated with manganese dioxide, said mercuric oxide constituting 52 percent to 87 percent by weight of said mix.

References Cited in the file of this patent

UNITED STATES PATENTS

| | | |
|---|---|---|
| 1,160,999 | Kaplan | Nov. 16, 1915 |
| 1,195,677 | Heil | Aug. 22, 1916 |
| 1,434,469 | Wilker | Nov. 7, 1922 |
| 2,481,539 | Ruben | Sept. 13, 1949 |